United States Patent [19]
Chandler

[11] 3,891,132
[45] June 24, 1975

[54] APPARATUS FOR TRANSPORTING A BICYCLE ON A VEHICLE

[75] Inventor: Roy L. Chandler, Arlington, Tex.

[73] Assignee: Red Ant Products, Inc., Mansfield, Tex.

[22] Filed: Jan. 29, 1973

[21] Appl. No.: 327,426

[52] U.S. Cl. .......................... 224/42.03 B; 214/450
[51] Int. Cl. ............................................. B60r 9/10
[58] Field of Search ............. 224/42.03 B, 42.03 R; 214/450; 211/22

[56] References Cited
UNITED STATES PATENTS

| | | | |
|---|---|---|---|
| 2,762,542 | 9/1956 | Hodgeman | 224/42.03 R |
| 2,803,349 | 8/1957 | Talbot | 224/42.03 B UX |
| 3,464,608 | 9/1969 | Rodriguez | 224/42.03 B |
| 3,567,052 | 3/1971 | Allen | 214/450 |
| 3,655,082 | 4/1972 | Garrett | 214/450 |

FOREIGN PATENTS OR APPLICATIONS

| | | | |
|---|---|---|---|
| 97,617 | 12/1939 | Sweden | 224/42.03 B |

Primary Examiner—Robert J. Spar
Assistant Examiner—Jerold M. Forsberg
Attorney, Agent, or Firm—Charles W. McHugh

[57] ABSTRACT

A bicycle carrier adapted to be mounted at a front or rear end of a vehicle such as an automobile or truck. An elongated rail is provided to support one or two bicycles in a generally upright position, and the weight of each bicycle is transfered to the rail through the bicycle's wheels. A versatile bracket is provided to hold the rail generally parallel with a vehicle bumper during transportation of the bicycle. A rotatable connection is optionally provided at one end of the rail so that the rail may be rotated on the order of 90° with respect to the static vehicle for loading and unloading of a bicycle. An L-shaped bearing member is provided as a part of the rotatable connection, such that a single member provides both a bearing surface and a means for adjusting the inclination of the bearing surface. When the rail is supported from the vehicle in a cantilevered position, said L-shaped bearing member can compensate for any sag due to the weight of bicycles on the rail.

6 Claims, 12 Drawing Figures

PATENTED JUN 24 1975 3,891,132

SHEET 2

3,891,132

APPARATUS FOR TRANSPORTING A BICYCLE ON A VEHICLE

This invention relates to devices for transporting bicycles at the front or rear end of a vehicle such as an automobile, truck, trailer, etc., such devices commonly being known as bike carriers.

There are many instances in which persons who own bicycles may wish to go from one location to another without riding their bicycle. In such cases, it is common to transport the bicycle on another vehicle such as an automobile or truck. Because of the relatively large size of bicycles, it is inconvenient to carry them within such a vehicle, and it is much more practical to suspend the bicycle somewhere outside the vehicle.

A large number of devices have been proposed in times past for carrying a bicycle on a vehicle. These include frames for holding a bicycle on top of an automobile in an inverted or generally erect position, frames for holding a bicycle on top of the trunk of an automobile in a generally horizontal position, hooks and ropes for suspending a bicycle at the front or rear of a vehicle by holding an upper portion of the frame, independent wheel wells for attachment to the bumper of a vehicle for supporting a bicycle through its wheels, etc. A difficulty with the frames that support a bicycle on top of a vehicle is that it usually takes at least two people to safely install and remove such a bicycle; and, even with two people, there is frequent scratching of paint on either the bicycle or the vehicle. The vertical structures that are adapted to suspend a bicycle from a hook which engages a bicycle frame member are perhaps adequate for men's bicycles, but they do not work for women's bicycles. Wheel wells which are attached to bumpers for supporting respective wheels of bicycles have certain advantages, but they—like most others—deny access to the adjacent portion of the vehicle when a bicycle is supported on the vehicle. Furthermore, many prior art bicycle carriers are lacking in sufficient structure, such that the installed bicycle must be placed on the carrier and then securely tied to the vehicle with ropes or the like. When two or more bicycles are being carried, it seems inevitable that ropes and the like never remain absolutely taut, such that they eventually contribute to relative movement between two bikes or sometimes between the bikes and the vehicle. If the vehicle happens to be the family automobile, relative movement which results in scratches and damage to appearance (to either the automobile or the bicycles) is never popular. Accordingly, it is an object of this invention to provide a bicycle carrier for transporting a bicycle at one end of a vehicle with an apparatus that can be easily loaded and unloaded by a single person.

It is another object to provide a bicycle transporter in which two bicycles of any shape or variety can be mounted side by side.

Another object is to provide a bicycle carrier on which two bicycles may be installed and either of the bicycles may be removed from the carrier without disturbing the other bicycle.

One more object is to provide a bicycle carrier which can be securely mounted adjacent one end of a vehicle during transportation of a bicycle, and rotated by some 90° with respect to the vehicle for loading and unloading of bicycles, or permitting access to the vehicle (such as the door of a pickup camper).

These and other objects and advantages will be apparent from the specification and the drawings provided herewith. In the drawing.

Briefly, the invention relates to a bicycle carrier for transporting either one or two bicycles at the front or rear end of a vehicle such as an automobile, truck, trailer, mobile home, or the like. The apparatus includes a mounting bracket which is adapted to transfer loads from the bicycle carrier to the frame of the vehicle, either directly or through the vehicle's bumper. An elongated rail is provided for attachment to at least one bracket, said rail being designed to support the weight of a bicycle mounted thereon, and the rail being adapted to be mounted adjacent the bumper of the vehicle in a generally horizontal position. Extending upwardly from the center portion of the rail is a post to which some part of the frame of the bicycle may be attached by a clamp. The rail is designed to support substantially all of the weight of the bicycle through the bicycle's wheels, and the clamp is designed to merely maintain the bicycle erect. For those cases in which access to the end of a vehicle may be desirable, such as access to the rear door of a truck or the front engine compartment of an automobile, a rotatable connection is provided at one end of the rail. During loading or unloading of a bicycle, or when otherwise desired, the rail may be rotated outwardly in a centilevered fashion from the vehicle; during transportation of the bicycle, the rail is returned to a position generally paralleling the bumper, and it is preferrably secured thereto at both ends. To insure the proper rotation of the rail with respect to the vehicle, a means is provided for adjusting the inclination of a cylindrical bearing surface which is a part of the rotatable connection. To insure the widest possible utility of the carrier with a great variety of vehicles, a bracket is provided which has great flexibility in its capacity to accomodate bumpers of various shapes and sizes, such that the bracket can practically be categorized as a universal bumper bracket.

Figure 1:
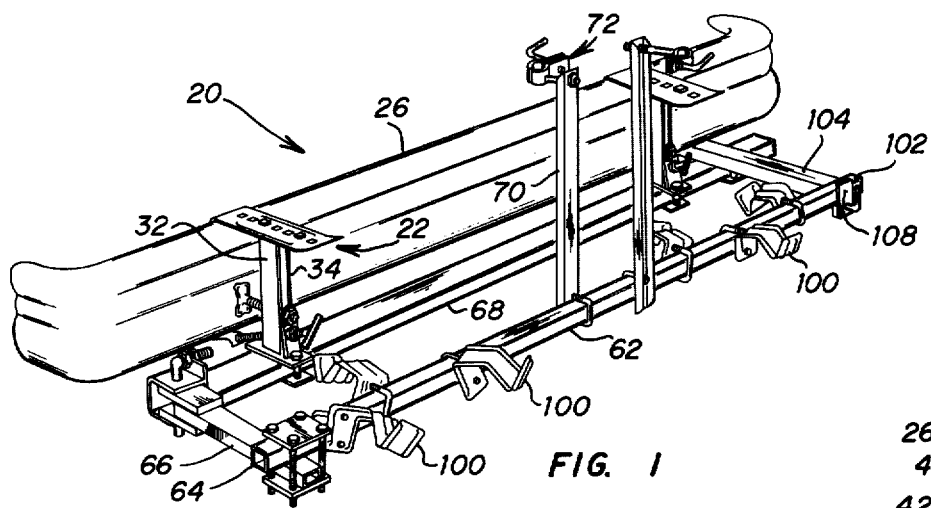
FIG. 1 is a perspective view of a bicycle carrier which has been attached to the bumper of a vehicle.

With initial reference to FIG. 1, a bicycle carrier 20 for transporting one or two bicycles at one end of a vehicle such as an automobile, truck, trailer, motor home, etc., is shown. A major structural element of the carrier 20 is a bracket 22 which is adapted to be mounted at one end of the vehicle and to transfer generally vertical loads to the frame of the vehicle. Most vehicles will have bumpers, and it is normally expedient to connect a bracket to the bumper rather than directly connecting it to the frame of the vehicle. The result of transferring loads to the frame will be the same, of course, whether a bracket is attached to the bumper or directly to the frame.

Figure 2:
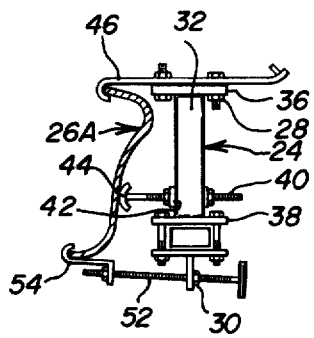
FIG. 2 is an elevation view of a mounting bracket as viewed from one end of an adjacent bumper.

Referring next to FIG. 2, the bracket 22 for attachment to bumpers of vehicles will now be described in greater detail. A structural member 24 is adapted to be positioned with a generally upright orientation near the outer surface of a vehicle bumper 26. Said structural member 24 has a top 28, and a bottom 30, and a finite length therebetween. The structural member 24 preferably constitutes two spaced and juxtaposed elements 32, 34 which are rigidly secured together at their ends, as by welded plates 36, 38. The rigid connection of elements 32, 34 and plates 36, 38 creates a hollow boxlike structure through which is conveniently mounted a compression member 40.

The compression bar 40 has a bearing surface 42 which is adapted to be placed against structural member 24 at any one of a plurality of positions located between the top 28 and the bottom 30 of the structural member. This is conveniently accomplished by providing threads on compression member 40 and appropriate nuts and washers to grip the vertical elements 32, 34 therebetween. The bar 40 has one end 44 which is adapted to bear against the outer surface of a vehicle bumper 26. The distal end 44 may advantageously be shaped in the form of a segment of a hollow cylinder, so that it may be oriented in either of two orthogonal directions to better bear against an adjacent bumper 26. Since the compression bar 40 is captively held between the two juxtaposed elements 32, 34, the bar 40 can be selectively moved up and down along the element 24, providing essentially an infinite number of mounting positions between the top and the bottom of member 24. The ability to move this compression member 40 is significant, since this member cooperates with two tension members (to be described) in accomodating practically all sizes and shapes of vehicle bumpers which are in commercial use.

The upper weld plate 36 has apertures through which bolts may be extended to mount an upper tension bar 46 to the top of the structural member 24. The upper tension bar 46 has a first end 48 and a second end 50, both of which ends preferably have a configuration for connection with the top edge of a bumper; but the two ends preferably have slightly different configurations such that one end may be more nearly appropriate to engage a particular bumper. Naturally, the upper tension bar 46 will have a finite length between its two ends 48, 50, and it is advantageous that provision be made for rigidly attaching the upper tension bar to the top of the structural member 24 at an intermediate position along the length of the bar 46. At least one end of the upper tension bar 46 should have a J-shaped configuration which is adapted to partially overhang the top edge of a bumper; the other end may advantageously have a relatively flat configuration with a barb-like portion extending therefrom.

Figure 3:
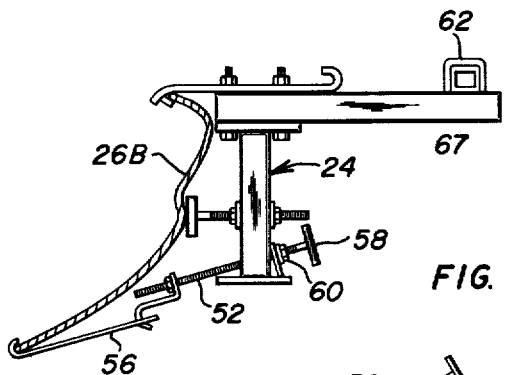
FIG. 3 is a mounting bracket similar to that of FIG. 2 and which is attached to a different bumper.
Figure 4:
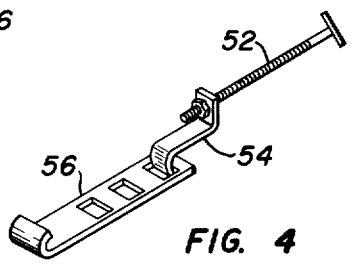
FIG. 4 is a perspective view of a bottom tension member and an extension therefore which is useful in attaching a bracket to a tall bumper such as the one shown in FIG. 3.

A bottom tension bar 52 is provided for attachment near the bottom end of the structural member 24. In the preferred embodiment, the bottom tension bar 52 constitutes a threaded rod which can be inclined at a plurality of angles with respect to the structural member 24. A hook 54 is provided to engage the bottom edge of the vehicle bumper 26, said hook constituting (in a functional sense) an end of the tension bar 52. For particularly high (or, as some may say, wide) bumpers such as shown in FIG. 3, an extension 56 may be provided to more readily connect the tension bar 52 with the bottom edge of the bumper 26B. As shown in FIG. 4, when extension 56 is employed, the hook 54 is inverted (as compared with FIG. 2), and its lip is inserted into an aperture of extension piece 56 rather than making direct contact with the bottom edge of the bumper.

Figure 5:
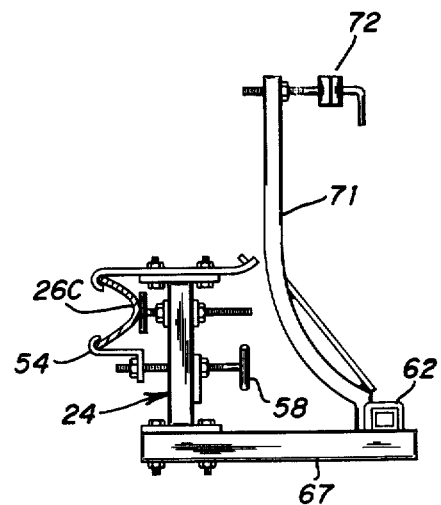
FIG. 5 is a bracket attached to still another form of vehicle bumper, and showing a portion of a bicycle carrier rigidly affixed to the bracket.

FIG. 5 illustrates how the tension and compression members are arranged whenever the structural member 24 is to be attached to a bumper which is shorter than the finite length of the member 24. Such bumpers are sometimes employed on relatively small sport cars. A casual comparison of FIG. 3 with FIG. 5 will reveal that the structural member 24 can be attached to bumpers which are either taller than or shorter than the fixed length of said member. This is made possible both by the arrangement of parts and the fact that both the compression bar and at least one of the tension bars has an effective length which is adjustable. Hence, when the compression bar 40 is installed between the bracket 22 and a bumper, the effective length of tension bar 52 can be shortened to the extent that the compression bar is compressed between the bracket and the bumper. To conveniently adjust the effective length of the tension bar 52, a handle 58 is provided for grasping the bar 52 so that it may be turned with respect to a static nut 60. By "effective length," it is intended to refer to those portions of a bar (and its appendages) which are in compression or tension, as the case may be, when the bar is installed.

Figure 6:
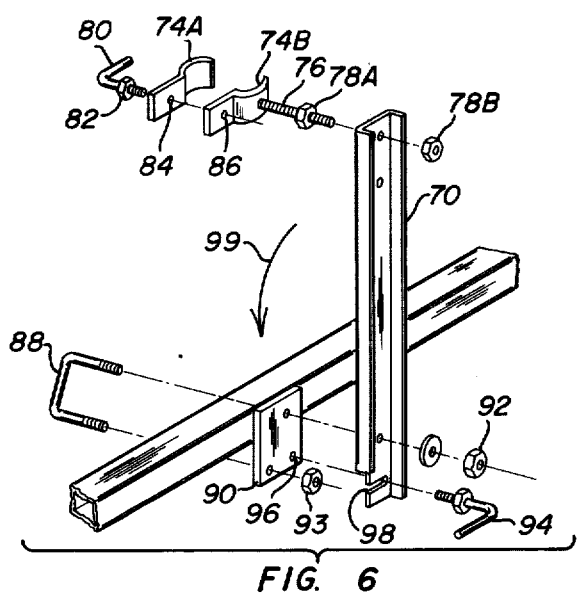
FIG. 6 is an exploded, perspective view of an upright post for holding a bicycle erect on a carrier of the invention.

Having fully described the bracket 22, attention will again be focused on FIG. 1 which shows an elongated rail 62 for supporting the weight of a bicycle through the bicycle's wheels when said bicycle is in a normally erect position. Structural means are provided for connecting a first rail end 64 to the bracket 22. Said structural means includes an arm 66 and a portion of cross tube 68 which is rigidly mounted to the bottom of structural element 24. (An optional means by which arm 66 may be rotatably connected to cross tube 68 will be described hereinafter.) An upright post 70 is adapted to be rigidly attached to the rail 62 at a selected position generally near the center of the rail; such a post is conveniently attached as illustrated with U-bolts and appropriate nuts. The location of an upright post 70 along the rail 62 will be largely determined by the user, in accordance with the character of the bicycles he wishes to install on the carrier and the relative size of each bicycle, as well as whether they have baskets or baby seats mounted thereon, etc. Rigidly mounted near the top of an upright post is a frame clamp 72. The manner in which frame clamp 72 is preferably mounted on an upright post can perhaps best be seen in FIG. 6. The purpose of frame clamp 72 is, of course, revealed by its descriptive name; but, as is well known, there are many different sizes and shapes of bicycle frames. In order to permit the instant carrier to accomodate any and all bicycles, it is necessary that a great deal of flexibility be built into the carrier. The clamp 72 satisfies this requirement by being versatile enough to accomodate both men's and women's bicycles, tall and short bicycles, as well as bicycles with varying sizes of frame members, etc. This is accomplished by providing two rigid and at least partially concave elements 74A, 74B which are adapted to encompass and clamp down on some portion of a bicycle's frame. Rigidly attached to concave element 74B is a threaded rod 76 having a length of several inches. Two nuts 78A, 78B are provided to secure the threaded rod to the upright post 70. It will be apparent that the concave member 74B can be secured at any of several positions alongside the upright post 70, depending upon the location of nut 78A. Thus, the concave portion 74B may be spaced from the post 70 by a distance which is equal to or less than the length of the rod threaded portion. The reason for providing the threaded rod 76 is to permit a bicycle which is mounted on the carrier to be held in an erect position, either very close to the upright post 70 or spaced therefrom by several inches. With this flexibility in the location of a clamp 72, two bicycles may be placed side by side and inclined outwardly from one another, so that any bulky attachments (such as baskets) will not rub against an adjacent bicycle. The concave element 74B may be rotated as required so that it may be aligned with some adjacent portion of a bicycle frame. Once the clamp 74B is aligned for a particular bicycle, and the nuts 78A, 78B are tightened, then element 74B need not ever be moved. The second half of the clamp 72 (which is concave element 74A) is designed to rotate some 90° with respect to concave element 74B, such that a bicycle frame may be freely moved into and out of engagement with the clamp. This is accomplished by having an L-clamp bolt 80, with a jam nut 82 permanently secured thereto, which extends freely through aperture 84 in an ear attached to concave element 74A. The threaded portion of bolt 80 engages a threaded hole 86 in concave element 74B. Thus, when a person tightens bolt 80 by screwing it into threaded hole 86, the movable concave element 74A is forced toward fixed concave element 74B. By insuring that the element 74A has a suitable orientation as the bolt 80 is turned, a portion of the bicycle frame will be securely gripped within the concave portions 74A, 74B. The concave portions 74A, 74B can be suitably padded, of course, to preclude scratching of a frame which is locked therebetween.

In some embodiments, it may be desirable to have an upright post 70 which is only temporarily fixed with respect to rail 62, such as during the storage or transportation of a bicycle. At other times, such as during loading, it may be desirable to rotate post 70 down to a generally horizontal position. This is made possible by the construction shown at the bottom half of FIG. 6. A U-bolt 88 extends across rail 62 and passes through two apertures in plate 90. The top leg of U-bolt 88 also extends through upright post 70 and is secured by nut 92. A bottom corner of post 70 is cut away so that nut 93 may securely hold the plate 90 without also permanently holding post 70. An L-shaped clamp bolt 94 (similiarly to bolt 80) extends through a slot 98 in post 70 and engages a threaded hole 96 in plate 90. It will be apparent that when bolt 94 is securely screwed into hole 96, the post 70 will be rigidly held against rail 62 by two spaced mounting bolts. When bolt 94 is partially removed from hole 96, the post 70 will be held in place by only the top leg of U-bolt 88. Accordingly, the post 70 may be rotated downward in a direction represented by arrow 99. In its down position, the post 70 will permit access by the driver to anything behind rail 62, such as another bicycle or some portion of the vehicle.

Also attached to rail 62 are means for cooperating with frame clamp 72 for supporting a bicycle in a generally erect position. Said means include at least three wheel supports 100 for each bicycle to be supported by the rail 62. Two of the supports 100 are mounted toward one end of the rail 62, and they are located at positions which are, respectively, slightly fore and slightly aft of the center of one bicycle wheel. At the time that the wheel support 100 are being installed on the rail 62, they are preferably inclined in opposite directions so that a bicycle wheel will be "nested" between the two supports; thus, the brackets 100 will both support and inhibit the rolling of one wheel. It is preferred that the nested wheel be the front wheel of the bicycle, since this will tend to hold the bicycle in a single plane. That is, holding the front wheel in this manner will prevent it from turning as well as rolling. At least one other wheel bracket 100 is mounted on the same side of the rail 62, preferably directly below the center of the second bicycle wheel. Since the first two wheel supports 100 will prevent the bicycle from tending to roll, there is no real need to also provide two supports for the other wheel. While it might be possible to replace the tube 62 and the associated brackets 100 with an upward-facing channel section, the strength-to-weight ratio of the illustrated box channel (and its associated brackets) is greater than would be a piece of channel iron. And while it is deemed necessary to provide sufficient structure in a bicycle carrier to supply an appropriate degree of rigidity, it is also true that extra pounds that are hung on a bumper can eventually have adverse consequences. Accordingly, the hollow tube 62 shown in FIG. 1 is the preferred embodiment for a structural member to support a bicycle.

Figure 7:
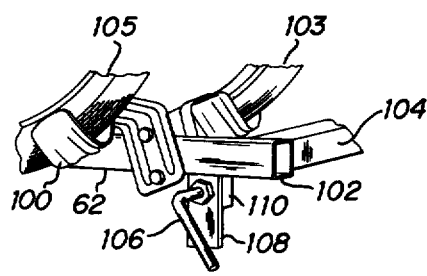
FIG. 7 is a perspective view of a clamp for holding a swingable carrier during transportation of a bicycle, with said clamp being shown in its unlocked position.

Referring next to FIG. 7, a means for supporting a second end of the rail 62 during transportation of a bicycle as shown. The distal end 102 of the rail 62 is shown resting next to structure 104 which is rigidly connected to the frame. Extending downwardly from the horizontal arm and also extending slightly under rail 62 is an element 110 forming a part of structure 104. An L-clamp bolt 106 is adapted to engage a threaded hole in element 110. Between a nut affixed to bolt 106 and structure 110 is a rotatable clamp plate 108. When bolt 106 is turned inwardly with respect to element 110, plate 108 can be pressed against rail 62, thereby preventing plate 108 from rotating; when bolt 106 is loosened, plate 108 may be rotated. As seen in FIG. 7, plate 108 has been rotated to a downward position, whereby rail 62 may be pulled away from structure 104 at will. When the rail 62 has been pulled away from the vehicle, the interiorly mounted bicycle represented by tire 103 can be freely removed from the rail without disturbing the exteriorly mounted bicycle represented by tire 105. When it is desired to store or transport a bicycle on the rail 62, the rail is returned to its rest position against structure 104, and the plate 108 is rotated to an upward and blocking position (as shown in FIG. 1). The handle of bolt 106 is then turned clockwise until the plate 108 is caused to bear firmly against rail 62. Vertical loads at this end of the carrier 20 are then transmitted through fixed structure 104 to the frame of the vehicle.

An inspection of FIG. 7 will reveal that the rail 62 is shown as resting just above handle 106 and plate 108. Whether the rail 62 could be swung away from structure 104 without applying a significant lifting force, or subsequently swung back into the rest position without having to lift it much, will depend to a certain extent upon the weight that is mounted on cantilevered rail 62. That is, if the axis of rotation about which rail 62 rotates is permanently established when the carrier 20 is empty, placing one or two bicycles on the rail 62 may cause the same to sag so much that it does not easily mate with the supporting structure 104. To solve this problem, an apparatus like that shown in FIG. 8 is advantageously provided.

Figure 8:
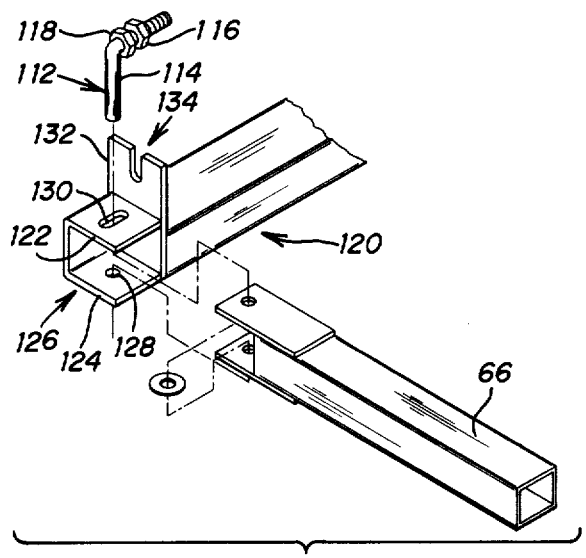
FIG. 8 is an exploded, perspective view of a rotatable connection whose axis of rotation is adjustable in a simple manner.
Figure 12:
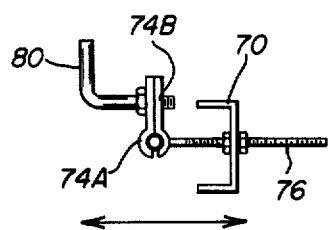
FIG. 12 is a top view of a clamp which is closed around a portion of a bicycle frame.

Referring specifically now to FIG. 8, a fixed structure 120 is provided, said structure having at least two spaced walls 122, 124 forming a groove or channel 126 therebetween. Said groove 126 is designed to provide clearance for a rotatable member; when used here in conjunction with a bicycle support rail, the rotatable member may be arm 66 to which the rail 62 is affixed. An aperture 128 is provided in the lower of the walls 124, and a slot 130 is provided in the second of the two walls 122. The slot 130 is opposite the aperture 128 in the first wall, and extends in a direction which is generally perpendicular to the groove 126. The slot 130 and the aperture 128 define a plane within which it is desired to adjust an axis of rotation.

A flange 132 extends upward (in this case) and away from the second wall 122 in a direction generally perpendicular to the opening of the groove. Said flange 132 also has an opening 134 which lies in the plane defined by the aperture 128 in the first wall and the slot 130 in the second wall. An L-shaped member 112 has a cylindrical bearing surface 114 along a first leg, and an irregular surface along the second leg. The first leg is adapted to engage the aperture 128 and also to span the gap between the two walls, i.e., between the aperture 128 and the slot 130. The second leg is adapted to extend from the vicinity of slot 130 and through the flange opening 134. Means are also provided for firmly securing the L-shaped member 112 to the flange 132. When the irregular surface on the second leg of the L-shaped member 112 constitutes a threaded surface (as shown), the means for securing the L-shaped member to the flange 132 will naturally constitute nuts or other internally threaded elements. A first nut 116 may be conveniently referred to as a leveling nut, since it is the one which primarily dictates the inclination of L-shaped member 112, which in turn dictates both the angle at which arm 66 is mounted and the inclination of rail 62. To adjust or "level" the cantilevered rail 62, nut 116 is selectively moved along the threads of member 112. As nut 116 is moved, the inclination of bearing surface 114 with respect to structure 120 is correspondingly varied. Once a suitable inclination has been achieved, the second nut 118, appropriately called a "jam" nut, is turned to tightly secure the L-shaped member 112 to the flange 132. When the opening 134 extends to an edge of flange 132 (as shown), the L-shaped member 112 can be removed from the apparatus (for inspection or replacement) by simply loosening the jam nut and lifting said member simult...... away from the flange opening 134 and the aperture 128. If the opening 134 did not extend to the edge of the flange 132, and if the flange were to be welded onto the structure after pivot pin 112 was in place, the pivot pin would be precluded from removal. This would also serve to permanently hold next to the groove any rotatable structure having a bore through which the pivot pin is inserted. One advantage of such a construction is that it could make very difficult the unauthorized removal of a rotatable structure (such as a bicycle rail, door or gate) but would not interfere with adjustment of the "swing" of such a structure. Another advantage of the basic apparatus is its simplicity, since a single member (i.e., the L-shaped pin 112) provides both a bearing surface and a means for adjusting the inclination of the same bearing surface.

Still another advantage of the structures disclosed herein can be understood by comparing FIGS. 3 and 5. In FIG. 5, a fixed arm 67 is rigidly attached to the bottom end of a bracket 22, so that the rail 62 is relatively low. This results in also keeping the mounted bicycles low, so as to perhaps reduce wind resistance against the bicycles on a moving vehicle and also to make loading and unloading of bicycle somewhat easier. But if it is desired to pull a trailer behind the vehicle, a low rail 62 like that of FIG. 5 would interfere with mating of a trailer hitch and the ball which is conventionally mounted behind the vehicle's rear bumper. In such a case, the alternate arrangement shown in FIG. 3 would permit either one or two bicycles to be mounted on the relatively high rail 62 while the lower area surrounding the trailer hitch is left unobstructed. Accordingly, the advantage of having identical plates 36, 38 with identical hole patterns at the top and bottom of the bracket 22 should be apparent.

Referring still to FIGS. 3 and 5, a rail 62 which is not adapted to be rotated provides a routine situation for the use of an exterior mounting post that can be swung down out of the way for handling an interior bicycle. Thus, the rotatable post 70 shown in FIG. 6 would be a logical post to be used with fixed rails. Also, the curved post 71 shown in FIG. 5 can be optionally used to provide increased clearance between two bicycles, by moving the interior post closer to the vehicle.

Figure 9:
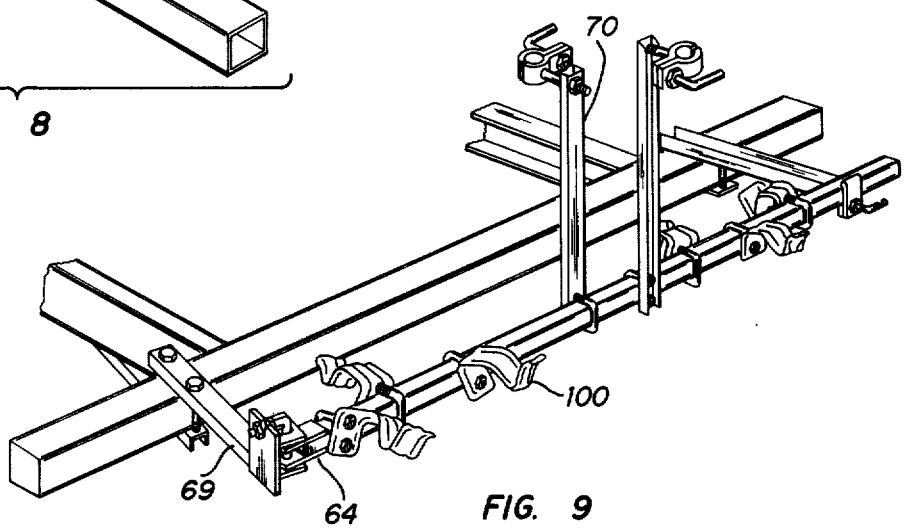
FIG. 9 is a perspective view of a bicycle carrier bolted to the bumper of a vehicle.
Figure 10:
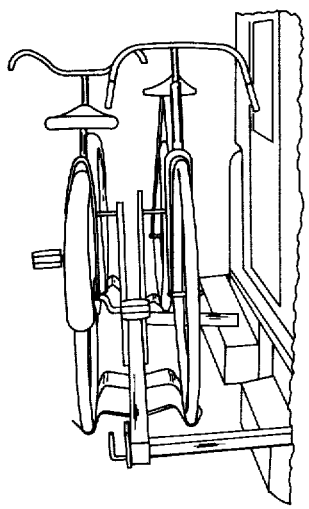
FIG. 10 is an elevation view from one end of a carrier showing two bicycles mounted thereon.
Figure 11:
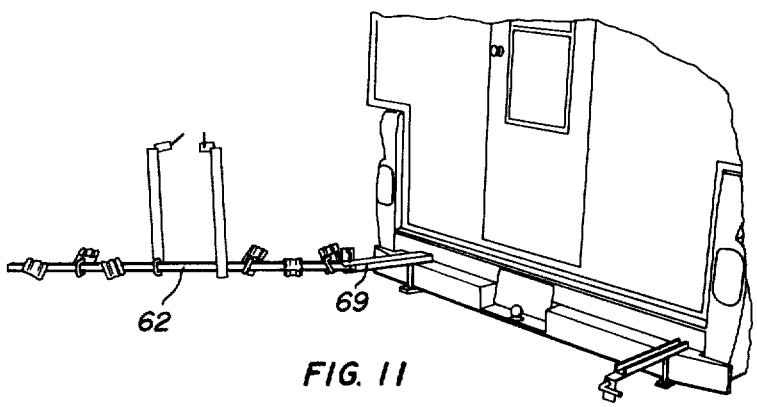
FIG. 11 is a view of a carrier for two bicycles rotated to a loading position.

While the bracket 22 previously described herein is extremely versatile, there are some trucks that will permit a more direct connection to the frame such as shown in FIG. 9. In that figure, an arm 69 is bolted directly to a bumper at the rear of the vehicle's chasis. A rotatable connection is provided at the proximate end 64 of the rail 62, and typical posts 70 and wheel brackets 100 are shown installed. Two bicycles are shown mounted on such a carrier in FIG. 10, including a typical reversed direction arrangement for the two bikes. The proximity of the camper door to the interior bicycle should make it clear why it is so desirable to be able to rotate a bike rail out of the way without having to first unload the bicycles. FIG. 11 shows how a rail 62 can be rotated away from the vehicle by some 90 degrees to provide unobstructed access to the rear of the vehicle.

While only the preferred embodiments of the invention have been disclosed in great detail herein, it will be apparent to those skilled in the art that modifications thereof can be made without departing from the spirit of the invention. Thus, the specific structure shown

What is claimed is:

1. A bicycle carrier for transporting a bicycle at one end of a vehicle such as an automobile or truck or the like, comprising:
   a. a bracket adapted to be mounted on a bumper at one end of the vehicle and to transfer generally vertical loads to the frame of the vehicle;
   b. structural means including an elongated cantilevered rail for supporting the weight of the bicycle at least partially through the bicycle's wheels when the bicycle is in a normally erect position;
   c. structural means for pivotally connecting the proximate end of the rail to the bracket, with the pivot axis being generally vertical such that the rail may be selectively swung outwardly away from the vehicle;
   d. an upright post for rigid attachment to the rail at a selected position near the center of the rail;
   e. a frame clamp;
   f. means for mounting the frame clamp near the top of the upright post, including means for adjustably locating the clamp adjacent some portion of the bicycle frame when the bicycle is supported in an erect position over the rail, whereby at least part of the weight of the bicycle is adapted to be transferred from the wheels to the rail and the frame clamp is adapted to maintain the bicycle erect;
   g. generally horizontal support means adapted to be mounted on the bumper for supporting the distal end of the rail during transportation of the bicycle; and
   h. means for adjusting the inclination of the axis of rotation of the rail with respect to the vehicle, whereby the distal end of the cantilevered rail can be selectively raised or lowered with respect to the support means to effect a desired distribution of the weight which is being transferred from the rail to respective portions of the bumper during transportation of the bicycle.

2. The bicycle carrier as claimed in claim 1 wherein the clamp is mounted at the end of a rod having at least a substantial portion which is threaded, and said threaded rod is employed to secure the clamp to the upright post at a position beside the post, and the threaded portion of the rod has a length of several inches, whereby the clamp may be secured to the upright post at any of several positions alongside the upright post and spaced therefrom by a distance equal to or less than the length of the rod threaded portion.

3. A bicycle carrier for transporting a bicycle at one end of a vehicle, comprising:
   a. a bracket adapted to transfer loads to the bumper of the vehicle;
   b. an elongated rail for supporting the weight of a bicycle mounted thereon, said rail being adapted to be mounted in a cantilever fashion at one end of the vehicle in a generally horizontal plane;
   c. structural means for pivotally connecting the proximate end of the rail to the bracket, and the pivot axis being generally vertical such that the rail can swing horizontally, with the inclination of the pivot axis being adjustable with respect to the bracket;
   d. bumper-mounted means for vertically supporting the distal end of the rail during transportation of the bicycle;
   e. at least three wheel supports for each bicycle to be supported on the rail, with two of the supports being mountable on the rail at positions slightly fore and slightly aft of the center of one bicycle wheel, so as to both support and also inhibit rolling of one wheel, and the third wheel support being mountable so as to support the second bicycle wheel;
   f. an upright post for rigid attachment to the rail at a selected position near the center of the rail;
   g. a frame clamp; and
   h. means for mounting the frame clamp near the top of the upright post, including means for adjustably locating the clamp adjacent some portion of the bicycle frame when the bicycle is supported by the rail, whereby substantially all of the weight of the bicycle can be carried by the wheel supports mounted on the rail, and the frame clamp is adapted to maintain the bicycle erect over the rail.

4. A bicycle carrier for transporting either one or two bicycles in a side-by-side fashion at one end of a vehicle such as an automobile or truck or the like, comprising:
   a. structural means including an elongated rail for supporting the weight of bicycles through the bicycle's wheels when the bicycles are mounted thereon in a normally erect and side-by-side position;
   b. means for rotatably connecting a first end of the rail to the vehicle's bumper such that the rail may be pivoted horizontally away from the vehicle through an angle of approximately 90°, with said means including a single vertical pin whose inclination is adjustable, whereby the plane in which the rail can rotate is adjustable by changing the inclination of the vertical pin;
   c. locking means for selectively holding the rail in a first position which is generally parallel to the end of the vehicle during transportation of the bicycles, and for selectively releasing the distal end of the rail so as to permit rotation of the rail away from the vehicle by approximately 90°, such that either of two bicycles may be mounted on or removed from the rail when it has been rotated away from the vehicle without disturbing the mounting of the other bicycle;
   d. bumper-mounted support means for vertically supporting the distal end of the rail during transportation of a bicycle mounted thereon, whereby the vibration incident to vehicle travel does not tend to place undue torsional loads on the vertical pin;
   e. an upright post for rigid attachment to the rail at a selected position near the center of the rail; and
   f. a frame clamp affixed to said upright post for attachment to a portion of said bicycle.

5. The bicycle carrier as claimed in claim 4 wherein the means for adjusting the angle of inclination of the vertical pin comprises a horizontally oriented and externally threaded rod rigidly fixed near a first end of the vertical pin, a static retainer for receiving the second end of the vertical pin, a fixed structure adjacent the vertical pin having an aperture for receiving the threaded rod, and at least one nut for engaging the threaded rod so as to position the rod at a desired location with respect to the fixed structure, whereby the inclination of the vertical pin is established by suitably adjusting the position of the threaded rod.

6. A bicycle carrier for transporting a bicycle at one end of a vehicle such as an automobile or truck or the like, comprising:
   a. a bracket adapted to be mounted at one end of the vehicle and to transfer generally vertical loads to the frame of the vehicle, said bracket comprising
      1. a structural member adapted to be positioned with a generally upright orientation near the outside surface of the vehicle bumper, said member having a top and a bottom and a finite length therebetween;
      2. a compression bar having a bearing surface which is adapted to be placed against the structural member at any one of a plurality of positions located between the top and bottom of the member, and having an end which is adapted to bear against the outer surface of the vehicle bumper;
      3. an upper tension bar for attachment to the top of the structural member, and having an end with a configuration for connection with the top edge of the bumper; and
      4. a bottom tension bar for attachment near the bottom end of the structural member, said bar having an end adapted for connection with the bottom edge of the bumper, and wherein both the compression bar and at least one of the tension bars have an effective length which is adjustable, whereby the effective length of at least one adjustable tension bar can be shortened to the extent that when the compression bar is installed between the bracket and the bumper that said compression bar can be compressed between the bracket and the bumper as the effective length of said adjustable tension bar is shortened;
   b. structural means including an elongated rail for supporting the weight of the bicycle through the bicycle's wheels when the bicycle is in a normally erect position;
   c. structural means for rotatably connecting a first end of the rail to the bracket, said means comprising:
      1. structure fixed to the vehicle and having at least two spaced walls forming a groove therebetween, said groove providing access for a rotatable arm rigidly connected to the rail;
      2. an aperture in a first one of the walls;
      3. a slot in the second of the two walls, the slot being opposite the aperture in first wall, and said slot extending in a direction which is generally perpendicular to the groove;
      4. a flange extending away from the second wall in a upward direction perpendicular to the opening of the groove, and said flange having an opening which lies in the plane defined by the aperture in the first wall and the slot in the second wall;
      5. an L-shaped member having a cylindrical bearing surface along a first leg and a threaded surface along the second leg, with the first leg being adapted to engage the aperture and also to span the gap between the aperture and the slot, and the second leg being adapted to extend from the slot through the flange opening; and
      6. nut means for firmly securing the L-shaped member to the flange, including at least two nuts for engaging the threaded surface on the second leg when said leg is inserted into the flange opening, and the inclination of the first leg with respect to the groove being adjustable in accordance with which portion of the second leg's threaded surface is utilized in securing the L-shaped member to the flange.
   d. an upright post for rigid attachment to the rail at a selected position near the center of the rail;
   e. a frame clamp; and
   f. means for mounting the frame clamp near the top of the upright post, including means for adjustably locating the clamp adjacent some portion of the bicycle frame when the bicycle is supported in an erect position over the rail, whereby substantially all of the weight of the bicycle is adapted to be transfered from the wheels to the rail and the frame clamp is adapted to maintain the bicycle erect.

* * * * *